W. DALTON.
ELECTRIC LOCOMOTIVE.
APPLICATION FILED AUG. 19, 1913.
1,084,317.
Patented Jan. 13, 1914.
3 SHEETS—SHEET 1.
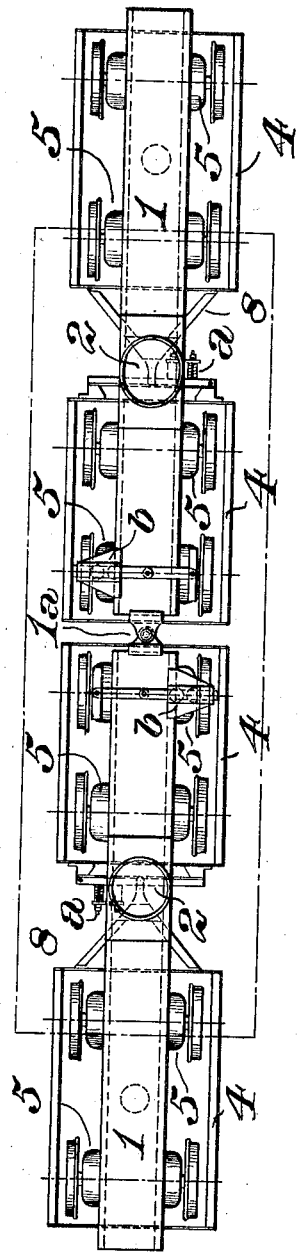
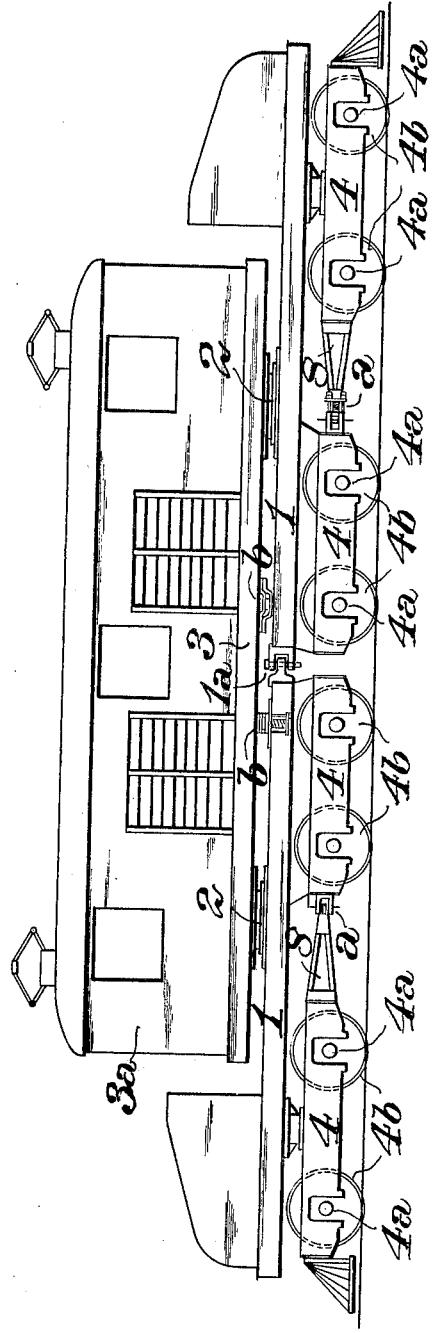
WITNESSES:
INVENTOR.

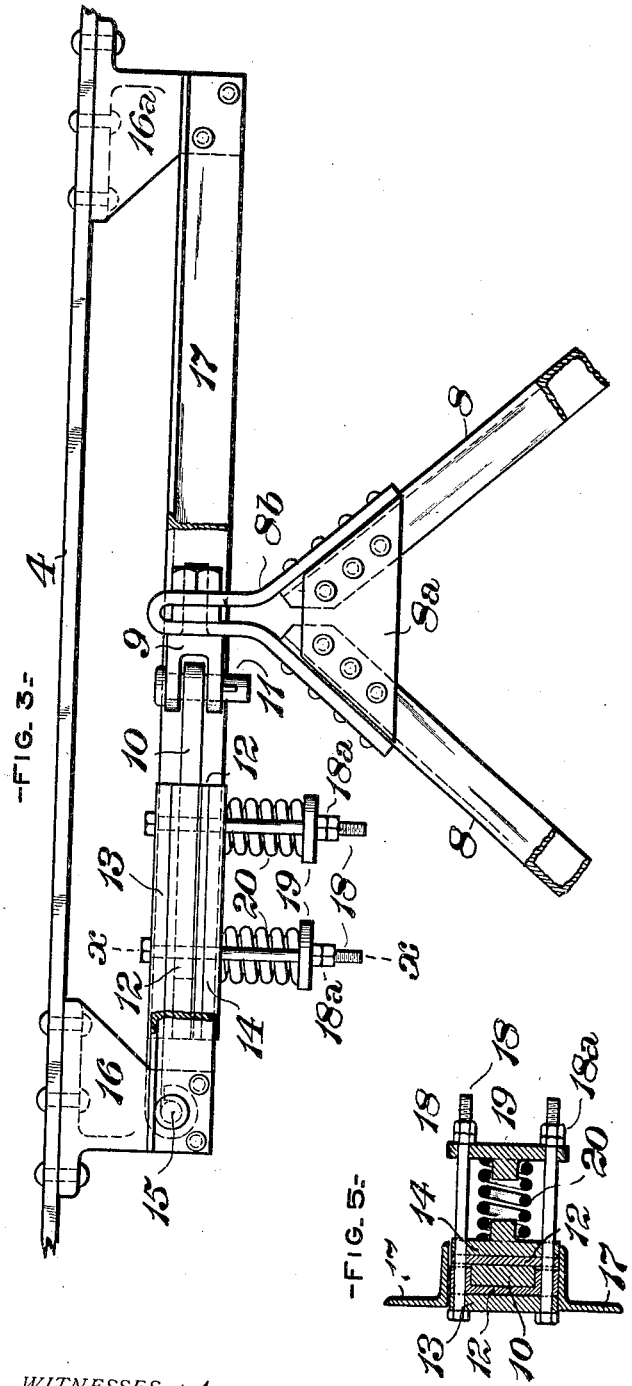

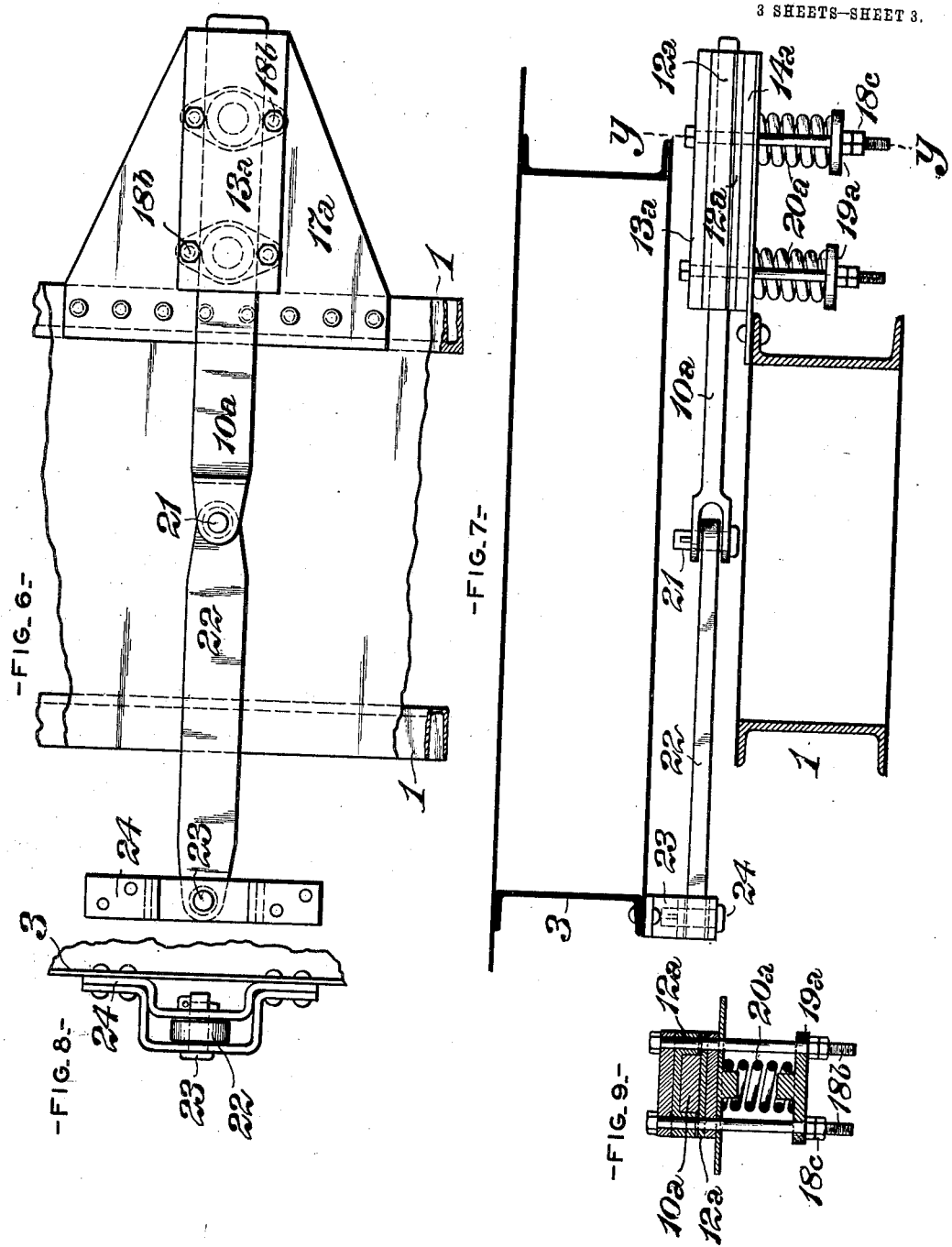

UNITED STATES PATENT OFFICE.

WILLIAM DALTON, OF SCHENECTADY, NEW YORK.

ELECTRIC LOCOMOTIVE.

1,084,317.  Specification of Letters Patent.  Patented Jan. 13, 1914.

Application filed August 19, 1913.  Serial No. 785,469.

*To all whom it may concern:*

Be it known that I, WILLIAM DALTON, of Schenectady, in the county of Schenectady and State of New York, have invented a certain new and useful Improvement in Electric Locomotives, of which improvement the following is a specification.

The object of my invention is to neutralize or reduce the destructive lateral vibration to which electric locomotives of the types which have a low center of gravity are subject. The vibration referred to is due, primarily, to the alternate increase and reduction of adhesion between the driving wheels and the rails when passing over uneven track at high speed, i. e., in passing a low spot, as a rail joint, the adhesion is momentarily decreased, causing that side of the locomotive or truck to loosen its grip upon the rail. As the torque is constant, the greater adhesion of the driving wheels upon the opposite side of the locomotive or truck (assuming the rail to be normal on that side) tends to slue or swing the locomotive, or that unit of the locomotive, toward the rail in which the low spot is located. As joints are usually alternated in the opposite rails, this sluing becomes a vibration like that of a pendulum, first toward one rail and then toward the other, which is very severe and destructive to the track, in the case of locomotives with a low center of gravity, as the blow is received directly upon the side of the rail head, without the modifying and softening effect of the action of the carrying springs, which, in locomotives with a high center of gravity, greatly lessens the shock, by allowing the rolling of the entire machine.

In a locomotive of the type herein exemplified, my invention, by the interposition of friction devices between the truck frames and the unit frames, or between the unit frames and the cab frame, or both, so modifies and reduces this lateral vibration that it becomes negligible.

The improvement claimed is hereinafter fully set forth.

In the accompanying drawings: Figure 1 is a side view, in elevation, of an electric locomotive, illustrating an embodiment of my invention; Fig. 2, a plan view of the same, with the cab removed; Fig. 3, a plan view, on an enlarged scale, of the friction device, interposed between the truck frame and unit frame; Fig. 4, a view, in elevation, of the same; Fig. 5, a section through one of the springs and the friction strips and backing plates, on the line $x$ $x$ of Fig. 3; Fig. 6, a plan view of the friction device interposed between the unit frame and the cab frame; Fig. 7, a view, in elevation, of the same, with the frames in section; Fig. 8, a similar view of the fastening to the cab frame; and, Fig. 9, a section through one of the springs and the friction strips, and backing plates, on the line $y$ $y$ of Fig. 7.

My invention is herein exemplified as applied in an electric locomotive having an articulated unit frame comprising two unit sections, 1, 1, which are articulated at their adjoining ends by a coupling pin, $1^a$. Each of the unit frame sections is provided, near its middle, with a center plate bearing, 2, which pivotally supports one end of a cab frame, 3, on which a cab, $3^a$, is mounted, in such manner as to permit free movement of the locomotive around curves. Each of the unit frame sections is supported on two swiveling trucks, 4, each of which is carried on two axles, $4^a$, on which are fixed pairs of wheels, $4^b$, and which are rotated by motors, 5, in the ordinary manner.

In the practice of my invention, I provide frictional resistance devices, indicated, as entireties, by the reference symbols, $a$, which are interposed between the two trucks, 4, of each of the unit frame sections, and frictional resistance devices, indicated as entireties, by the reference symbols, $b$, which are interposed between the unit frames and the cab frame. Referring first to Figs. 3 to 5 inclusive the friction devices, $a$, which are interposed between the trucks are, preferably, of the following construction. The trucks, 4, of each of the unit frame sections, are connected one to the other by extension bars, 8, which are secured to the frames of the outer trucks, and are inclined inwardly, and secured together, by plates, $8^a$, and a bar, $8^b$, which is bent into U form and inclined correspondingly with the extension bars. A jaw, 9, which extends transversely to the locomotive, is bolted to the outer end of the bars, $8^b$, and a friction bar, 10, is coupled by a pin, 11, to each of the jaws, 9, a limited amount of vertical movement of the friction bar being permitted by vertically elongating the hole therein through which the coupling pin, 11, passes. The bar, 10, is fitted to slide between friction strips, 12, of fiber or other suitable material, which are backed by plates, 13, 14, one of which, 13, is pivotally connected by a pin, 15, to a bracket, 16, secured to the adjoining end of the frame of the adjacent truck, 4. The friction strips and backing plates are housed between, and held in proper position by, angle bars, 17, which are secured, at their ends, to the bracket, 16, and to a similar bracket, 16ª, both of which are fixed to the adjacent truck frame, 4.

The required frictional resistance to longitudinal movement of the friction bar, 10, between the friction strips, 12, is imposed by bolts, 18, which pass through the friction strips and backing plates and through follower plates, 19, between which and the adjacent backing plates, 14, helical springs, 20, are interposed. The springs, 20, are brought to the required bearing on the backing plate, 14, by nuts, 18ª, engaging threads on the bolts, 18, and bearing on the outer sides of the follower plates.

The friction devices, b, which are interposed between the unit frames and the cab frame, are of substantially similar construction to those above described and are shown in Figs. 6 to 9 inclusive. The friction bars, 10ª, are, in this case, coupled by pins, 21, to link, 22, the opposite ends of which are coupled, by pins, 23, to supports, 24, fixed to the cab frame, and slide between friction strips, 12ª, backed by plates, 13ª, 14ª, and supported on brackets, 17ª, secured to the unit frame sections, 1. Frictional resistance to the longitudinal movement of the friction bars is, as in the construction before described, imparted by bolts, 18ᵇ, which pass through the friction strips and backing plates, and through follower plates, 19ª, between which and the adjacent backing plates, 14ª, helical springs, 20ª, are interposed. The springs, 20ª, are brought to the required bearing on the backing plates, 14ª, by nuts, 18ᶜ, engaging threads on the bolts, 18ᵇ, and bearing on the outer sides of the follower plates.

In the operation of an electric locomotive in which my invention is applied, the effect of the friction devices which are interposed between the swiveling trucks, and between the unit frames and the cab frame, as hereinbefore described, is, by reason of their resistance to the relative movements of the two members with which they are, respectively, connected, to substantially diminish or neutralize any tendency to rapid or violent vibration, while allowing said members all the range of movement which is necessary in traversing curves, and in accommodating themselves to variations in level and alinement of the track.

I claim as my invention and desire to secure by Letters Patent:

1. In a locomotive, the combination of a cab frame, a unit frame on which said cab frame is supported and which is fitted to swivel relatively to said cab frame, a plurality of pairs of motor driven wheels supporting said unit frame, and a frictional resistance mechanism interposed between and coupled to the unit frame and cab frame and adapted to oppose sudden horizontal oscillatory movements of the former relatively to the latter.

2. In a locomotive, the combination of a cab frame, an articulated frame comprising two coupled unit sections on which said cab frame is supported, the unit sections being each fitted to swivel relatively to said cab frame, a plurality of pairs of motor driven wheels supporting said unit frame sections, and frictional resistance mechanisms, each interposed between and coupled to one of the unit frame sections and the cab frame, and adapted to oppose sudden horizontal oscillatory movements of the former relatively to the latter.

3. In a locomotive, the combination of a cab frame, a unit frame on which said cab frame is supported, and which is fitted to swivel relatively to said cab frame, two swiveling trucks supporting said unit frame, a plurality of motor driven wheels on which said trucks are carried, and a frictional resistance mechanism interposed between and coupled to said trucks and adapted to oppose sudden horizontal oscillatory movements thereof relatively to the unit frame.

4. In a locomotive, the combination of a cab frame, an articulated frame comprising two coupled unit sections on which said cab frame is supported, the unit sections being each fitted to swivel relatively to said cab frame, two pairs of swiveling trucks, each pair supporting one of the unit sections, a plurality of pairs of motor driven wheels on which said trucks are carried, and frictional resistance mechanisms, each interposed between and coupled to one of the unit frame sections and the cab frame and adapted to oppose sudden horizontal oscillatory movements of the former relatively to the latter.

5. In a locomotive, the combination of a cab frame, an articulated frame comprising two coupled unit sections on which said cab frame is supported, the unit sections being each fitted to swivel relatively to said cab frame, two pairs of swiveling trucks, each pair supporting one of the unit sections, a plurality of pairs of motor driven wheels on which said trucks are carried, and frictional resistance mechanisms, each interposed between and coupled to the members of each pair of trucks and adapted to oppose sudden horizontal oscillatory movements thereof relatively to the articulated frame.

6. In a locomotive, the combination of a unit frame, two truck frame members adapted to support the unit frame and coupled with the capacity of relative horizontally swiveling movement, an extension fixed to one of said truck frame members, a frictional resistance member connected to said extension, a frictional resistance member connected to the other truck frame member, and means for applying pressure to said frictional resistance members in opposition to sudden horizontal oscillatory movements of the frame members.

WILLIAM DALTON.

Witnesses:
  E. I. SCHAUBER,
  WILL. W. HAMBLY.

Copies of this patent may be obtained for five cents each, by addressing the "Commissioner of Patents, Washington, D. C."